United States Patent [19]

Ogasawara

[11] Patent Number: 5,500,840
[45] Date of Patent: Mar. 19, 1996

[54] METHOD AND APPARATUS FOR ACCESSING READING AND/OR WRITING MEANS TO A DESIRED REGION ON AN INFORMATION RECORDING MEDIUM ON WHICH A PLURALITY OF TRACKS ARE SPIRALLY FORMED, IN ACCORDANCE WITH AN ESTIMATED ARRIVAL POSITION

[75] Inventor: Yutaka Ogasawara, Yokohama, Japan

[73] Assignee: Canon Kabushiki Kaisha, Tokyo, Japan

[21] Appl. No.: 988,878

[22] Filed: Dec. 10, 1992

[30] Foreign Application Priority Data

Dec. 13, 1991  [JP]  Japan .................................. 3-351375

[51] Int. Cl.$^6$ .................................................. G11B 17/22
[52] U.S. Cl. ............................... 369/32; 369/54; 369/58
[58] Field of Search ........................ 369/32, 44.33, 369/44.32, 44.28, 44.29, 44.26, 44.27, 44.31, 44.34, 58, 54, 59, 47, 48, 275.3, 275.4, 56, 57; 235/454

[56] References Cited

U.S. PATENT DOCUMENTS 5,018,124   5/1991   Ogasawara et al. ................. 369/44.33
5,257,248  10/1993   Ogasawara ............................. 369/32

*Primary Examiner*—Ali Neyzari
*Attorney, Agent, or Firm*—Fitzpatrick, Cella, Harper & Scinto

[57] ABSTRACT

An access of a device for writing or reading information from/to a desired region is performed in the following manner on an information recording medium on which a plurality of tracks are spirally formed. The recording medium is rotated and an arrival position of the writing/reading device is estimated when the device is accessed to a track on which the desired region exists. If the estimated position lies within the desired region, the writing/reading device is caused access to the track on which the desired region exists. If the estimated position is located after the desired region, the writing/reading device is caused to access one-preceding track of the track having the desired region.

7 Claims, 8 Drawing Sheets ns 5,500,840

METHOD AND APPARATUS FOR ACCESSING READING AND/OR WRITING MEANS TO A DESIRED REGION ON AN INFORMATION RECORDING MEDIUM ON WHICH A PLURALITY OF TRACKS ARE SPIRALLY FORMED, IN ACCORDANCE WITH AN ESTIMATED ARRIVAL POSITION

BACKGROUND OF THE INVENTION

1. Field of the Invention

The invention relates to a method and an apparatus for reproducing and/or recording information to/from an information recording medium on which a plurality of tracks are spirally formed.

2. Related Background Art

Hitherto, a magnetic disk, an optical disk, or the like has been known as a disk-shaped information recording medium. Information tracks to record information are concentrically or spirally formed on such a disk-shaped recording medium. Those information tracks are divided into a plurality of sectors and information is recorded and/or reproduced on a sector unit basis. When the recording or reproduction of continuous sectors existing in a plurality of sectors is executed, in a case of concentrical information tracks, in order to record or reproduce a next track, it is necessary to move a recording or reproducing head to the next track. However, in a case of spiral tracks, the recording or reproduction can be continuously executed without moving the head. Therefore, spiral information tracks are frequently used in an optical disk which handles continuous data and the like.

In a case of recording or reproducing a data block consisting of a plurality of continuous sectors by using a recording medium having spiral information tracks, the head is certainly moved to the head of the data block and, after that, the recording or reproducing is executed so that processes can be successively performed. On the other hand, in a case of moving the head to the head of the data block, in order to move the head at a high speed, a coarse seeking is first performed at a high speed and a sector ID (identification data) is detected in this region. When there is an error, it is corrected and a minute seeking is executed, thereby accessing to a target sector. The above seeking operation will now be practically explained with reference to FIGS. 1 to 3. FIG. 1 is a diagram showing a part of the spiral information tracks on a recording medium. Tracks n−1, n, and n+1 are formed from the inner rim direction toward the outer rim direction. It is assumed that data is recorded or reproduced from the inner rim toward the outer rim. One track is divided into 25 sectors comprising sectors 0 to 22. One sector consists of 512 bytes.

FIG. 2 is a schematic diagram showing each track in FIG. 1. Sixteen sectors of the sectors 0 to 15 of the track n, that is, 8 kbytes are shown by a hatched portion and such a portion is referred to as a block A. A recording and reproducing process of the block A by the recording and/or reproducing apparatus will be described with reference to FIG. 3. First, to access the sector 0 of the track n corresponding to the position of the head of the block A, the coarse seeking is executed as shown by an arrow a. Subsequently, the sector ID is detected as shown by an arrow b. In this example, the track n and the sector 5 are detected. Therefore, the sector ID which has been detected because of the coarse seeking doesn't coincide with a target sector ID and a head goes beyond a target position. Therefore, in order to execute the minute seeking as mentioned above, the head is jumped to the track n−1 as shown by an arrow c and the apparatus waits for the rotation of the recording medium as shown by an arrow d. After that, the data block A is sequentially recorded or reproduced from the head sector as shown by an arrow e.

In the above conventional apparatus, however, in the case when the sector at which the head has arrived by the coarse seeking exceeds the target sector, even if the arrival position is located in the data block to be recorded or reproduced, the recording or reproduction is not performed and the minute seeking to the head sector is certainly executed. There is, consequently, a problem such that the whole seeking time increases.

SUMMARY OF THE INVENTION

It is an object of the invention to solve the problems of the conventional techniques mentioned above and to provide information reproducing and/or recording method and apparatus, in which a processing time when recording or reproducing information to/from a desired region is shortened.

To accomplish the above object, according to the invention, there is provided a method of accessing reading and/or writing means to a desired region on an information recording medium on which a plurality of tracks are spirally formed, comprising the steps of: rotating the medium; estimating an arrival position at a time point when the reading and/or writing means is accessed to a track having the desired region; accessing the reading and/or writing means to the track having the desired region when the estimated position is located in the desired region; and accessing the reading and/or writing means to the one-preceding track of the track having the desired region when the estimated position is located after the desired region.

There is also provided an information reproducing and/or recording apparatus which is used to embody the above method, in which the apparatus comprises: means for rotating the information recording medium; reading and/or writing means for recording and/or reproducing information while tracing the track; accessing means for accessing the reading and/or writing means to a desired track; estimating means for estimating an arrival position at a time point when the reading and/or writing means is accessed to the track having the desired region; and control means for controlling the accessing means in accordance with the estimated arrival position, wherein the control means controls the accessing means in a manner such that when the estimated arrival position lies within the desired region, the reading and/or writing means is accessed to the track having the desired region, and that when the estimated arrival position is beyond the desired region, the reading and/or writing means is accessed to the one-preceding track of the track having the desired region.

Further, according to the invention, there is also provided a method of reproducing and/or recording information from/to a desired region of an information recording medium on which a plurality of tracks are spirally formed by reading and/or writing means, whereby the method comprises the steps of: rotating the information recording medium; moving the reading and/or writing means from the last position of the desired region to a one-preceding track of the track having the desired region and discriminating whether the medium has rotated one or more times or not for a period of time until the reading and/or writing means arrives at the head position of the region in association with the rotation of the medium while tracing the track; accessing the reading and/or writing means to the one-preceding track of the track having the desired region when it is determined that the medium rotates one or more times, waiting until the reading and/or writing means arrives at the head position of the region in association with the rotation of the medium while tracing the track, and reproducing and/or recording information from the head of the region after that; estimating an arrival position at a time point when the reading and/or writing means is accessed to the track having the desired region when it is determined that the medium doesn't rotate one or more times; accessing the reading and/or writing means to the track having the desired region in the case when the estimated position lies within the desired region; reproducing and/or recording information from the head of the desired region in the case when the arrival position of the reading and/or writing means is located at the head of the desired region; first reproducing and/or recording information from/to a portion after the arrival position of the region when the arrival position of the reading and/or writing means is located on a route in the desired region, moving the reading and/or writing means to the one-preceding track of the track having the desired region after that, waiting until the reading and/or writing means arrives at the head position of the region in association with the rotation of the medium while tracing the track, and reproducing and/or recording information from the head of the region to a portion before the arrival position; and accessing the reading and/or writing means to the one-preceding track of the track having the desired region when the estimated position is located after the desired region, waiting until the reading and/or writing means arrives at the head position of the region in association with the rotation of the medium while tracing the track, and reproducing and/or recording information from the head of the region.

DETAILED DESCRIPTION OF THE PREFERRED EMBODIMENT

Figure 2:
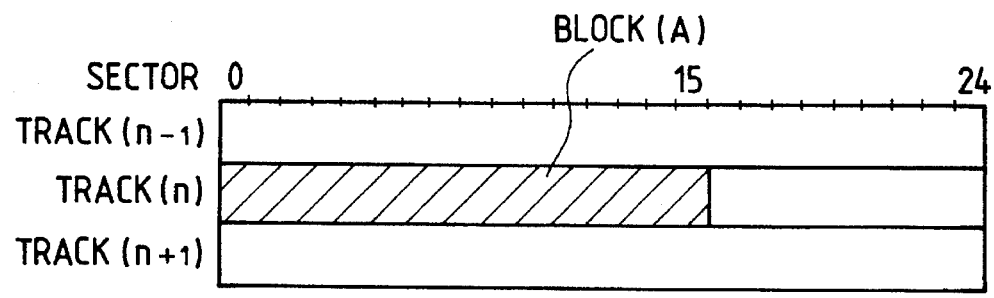
FIG. 2 is a schematic diagram showing a construction of the tracks in FIG. 1.
Figure 3:
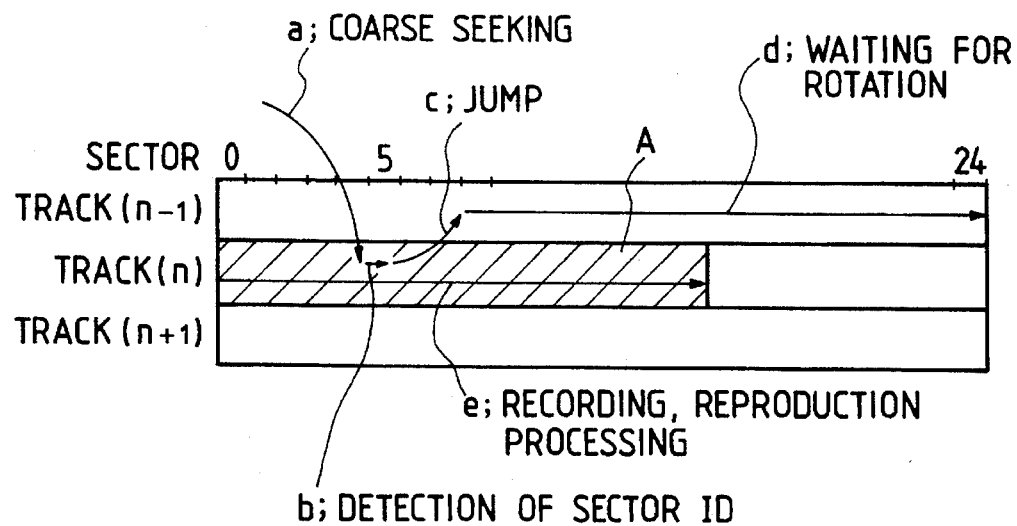
FIG. 3 is a schematic diagram for explaining a conventional method of reproducing information recorded in a desired region.
Figure 4:
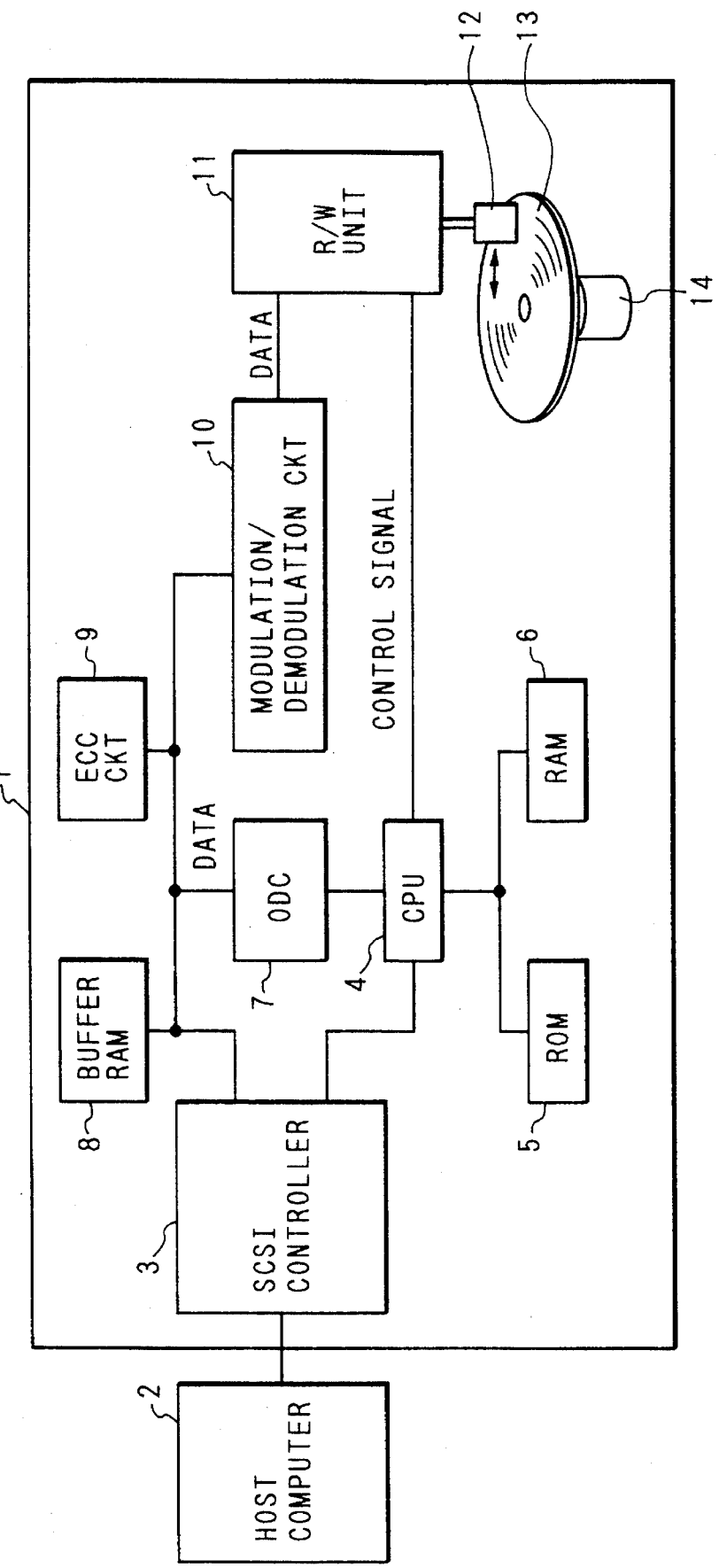
FIG. 4 is a block diagram showing an embodiment of an information reproducing and/or recording apparatus of the invention.

An embodiment of the invention will be described hereinbelow in detail with reference to the drawings. FIG. 2 is a block diagram showing an embodiment of an information recording and/or reproducing apparatus of the invention. In FIG. 4, an optical disk drive apparatus 1 is connected to a host computer 2 and records data to an optical disk 13 or reproduces data from the optical disk in accordance with an instruction from the host computer 2. An SCSI (Small Computer System Interface) is used as an interface between the optical disk drive apparatus 1 and the host computer 2. A hand shaking such as a command, data, or the like is executed by an SCSI controller 3. A central processing unit (CPU) 4 receives a command sent from the host computer 2 through the SCSI controller 3 and controls data reading/writing processes, which will be explained hereinafter. A read only memory (ROM) 5 is a fixed memory in which control programs of the CPU 4 have been stored. A random access memory (RAM) 6 is a work memory of the CPU 4.

An ODC (Optical Disk Controller) 7 controls read/write data and its operation is controlled by the CPU 4. A buffer RAM 8 is a buffer memory for the read/write data. An ECC circuit 9 is a circuit to execute a modulating process to add an ECC (Error Correction Code) to user's data or a demodulating process to perform an error correction by the ECC. The ECC circuit 9 also has a verifying function to judge whether defects of a predetermined amount or more exist in the reproduction data or not by using the ECC. A modulation/demodulation circuit 10 is a circuit to modulate a recording signal to the optical disk or demodulate a reproduction signal from the optical disk. A read/write (R/W) unit 11 is an apparatus for recording data to the optical disk or reading data from the optical disk.

The R/W unit 11 has an optical head 12 and moves the optical head 12 in the radial direction of the optical disk 13. The optical disk 13 is rotated by a spindle motor 14.

Figure 5:
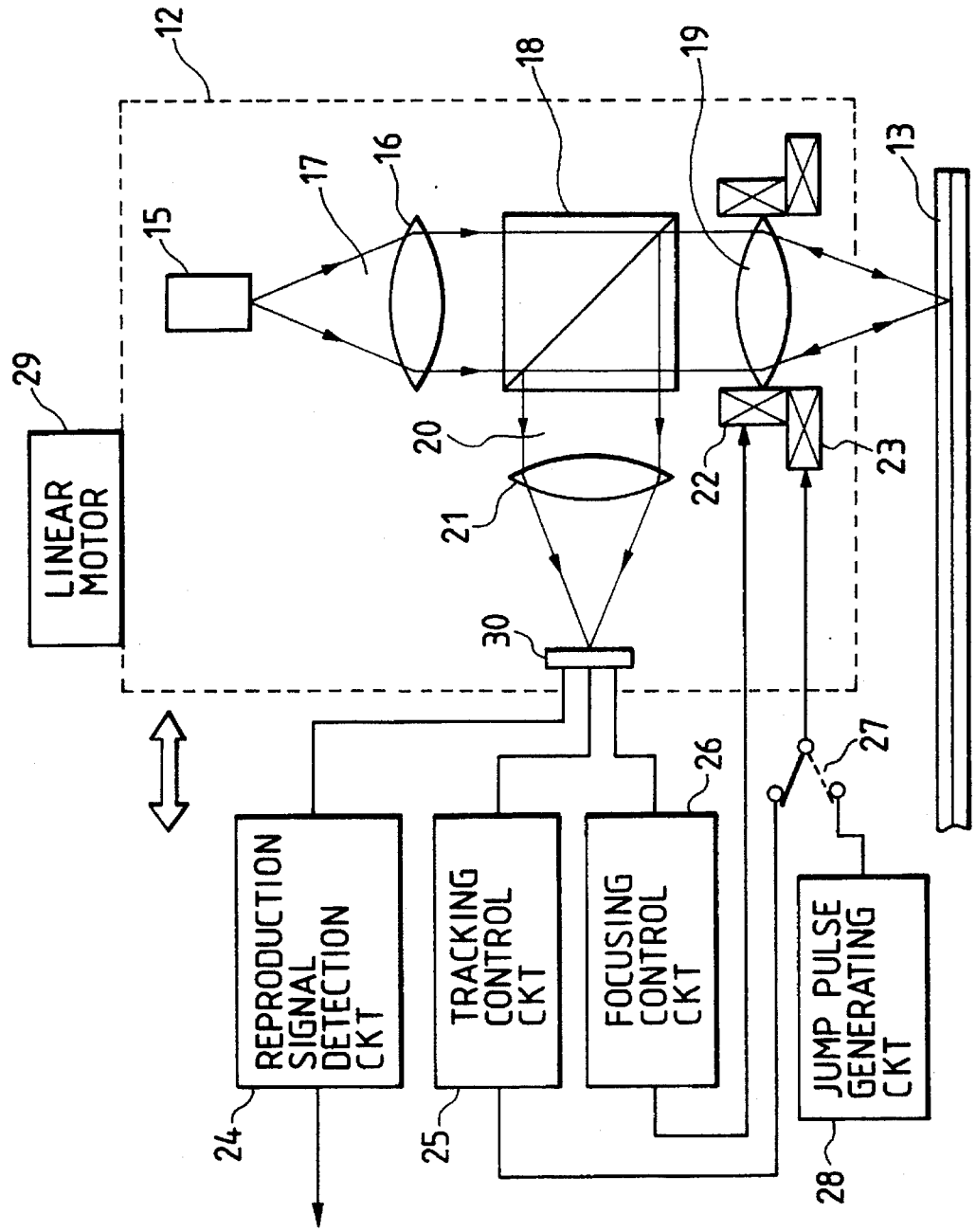
FIG. 5 is a schematic diagram showing a construction of a read/write unit of the apparatus of FIG. 4.

FIG. 5 is a schematic diagram showing a construction of the R/W unit 11. In FIG. 5, the same component elements as those shown in FIG. 4 are designated by the same reference numerals. The optical head 12 is moved in the radial direction of the optical disk 13 by a linear motor 29. The optical head 12 has a semiconductor laser 15. The semiconductor laser 15 emits to the optical disk a laser beam whose intensity has been modulated in accordance with data which is sent from the modulation/demodulation circuit in FIG. 4 in the recording mode. On the other hand, in the reproducing mode, the semiconductor laser 15 emits a non-modulated laser beam of a low intensity toward the optical disk.

A laser beam 17 emitted from the semiconductor laser 15 is converted into a parallel beam by a collimator lens 16 and is transmitted through a beam splitter 8 and is converged onto an information surface of the optical disk 13 by an objective lens 19. The objective lens 19 is moved in the direction of an optical axis by a focusing actuator 22 and is moved in the direction perpendicular to the optical axis by a tracking actuator 23, respectively. A laser beam 20 reflected by the optical disk 13 is further reflected by the beam splitter 18 and passes through a sensor lens 21 and is received by a photodetector 30. In the reproducing mode of information, a reproduction signal is detected by a reproduction signal detection circuit 22 from an output of the photodetector 30 and is sent to the modulation/demodulation circuit 10 in FIG. 4. A tracking error signal and a focusing error signal are detected by a wellknown method from the output of the photodetector 30, respectively.

The tracking error signal is fed back to the tracking actuator 23 through a tracking control circuit 25 and a switch 27 and a tracking control is performed so that a spot of the laser beam traces the track formed on the medium. The focusing error signal is fed back to the focusing actuator 22 through a focusing control circuit 26 and a focusing control is executed so that the laser beam is focused onto the information surface of the medium.

When a command of the coarse seeking is sent from the CPU 4 in FIG. 4, the R/W unit 11 moves the optical head 12 by the linear motor 29, thereby moving the spot of the laser beam emitted from the optical head toward the track having a desired region. When a command of the track jump is sent from the CPU 4, the switch 27 in FIG. 5 is switched and a jump pulse generating circuit 28 is connected to the tracking actuator 23. When a jump pulse signal is generated from the jump pulse generating circuit 28, the tracking actuator 23 moves the objective lens 19 in the direction such that it traverses the track by a micro-amount. Due to such a movement, the laser beam spot irradiated to the medium moves from the track to which the spot has traced so far to the adjacent track.

Figure 6:
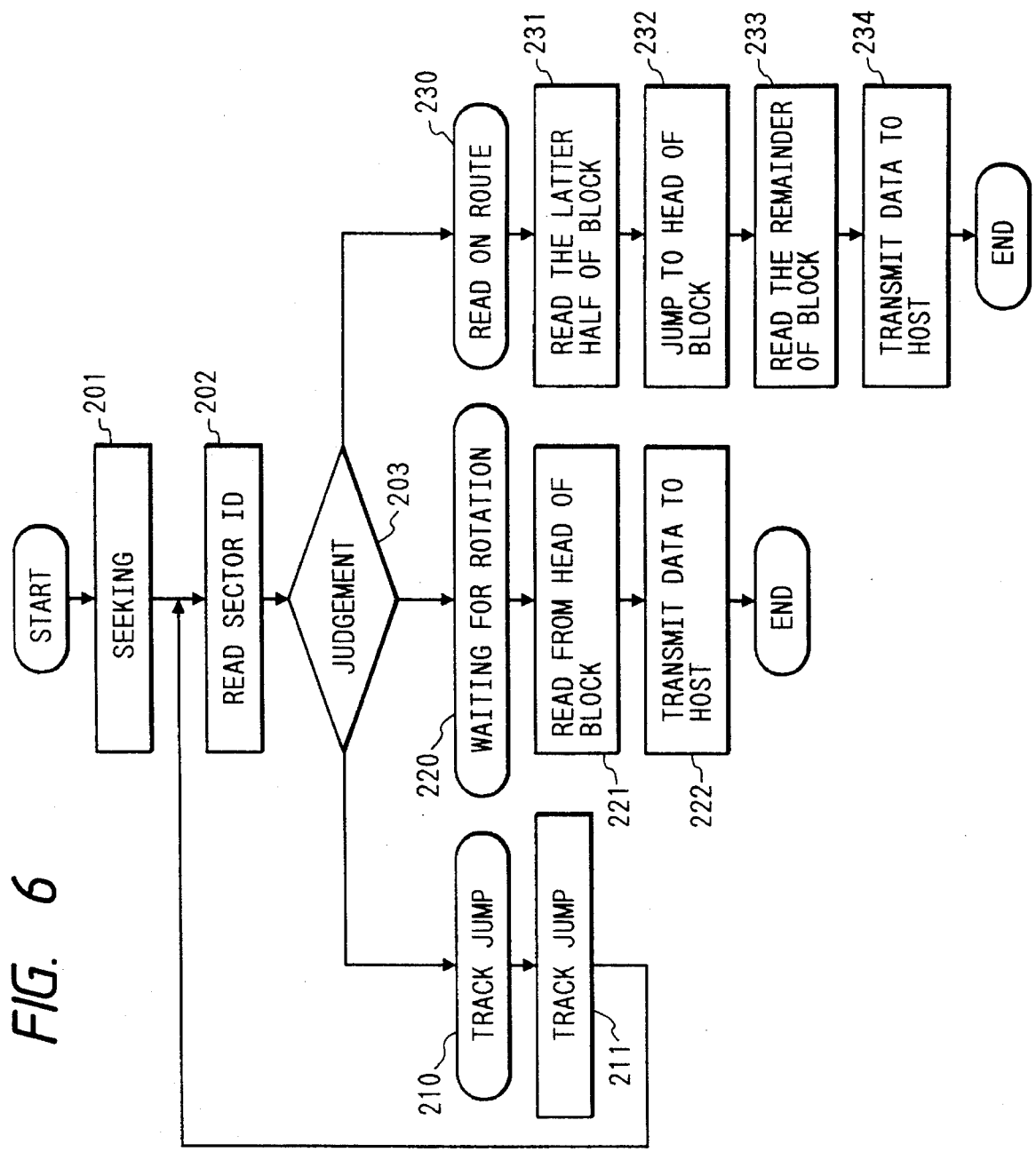
FIG. 6 is a flowchart for explaining an information reproducing method of the invention.

The operation of the embodiment will now be described with reference to FIG. 6. The operation in the reproducing mode will now be explained.

In the following description, the coarse seeking denotes that the optical head is moved toward a desired region by the linear motor. The track jump denotes that by moving the objective lens in the direction so as to traverse the track, the laser beam spot is moved to the adjacent track. The waiting for rotation denotes that the apparatus waits until the read and/or write means arrives at the head position of the region in association with the rotation of the medium while tracing the track.

Figure 7:
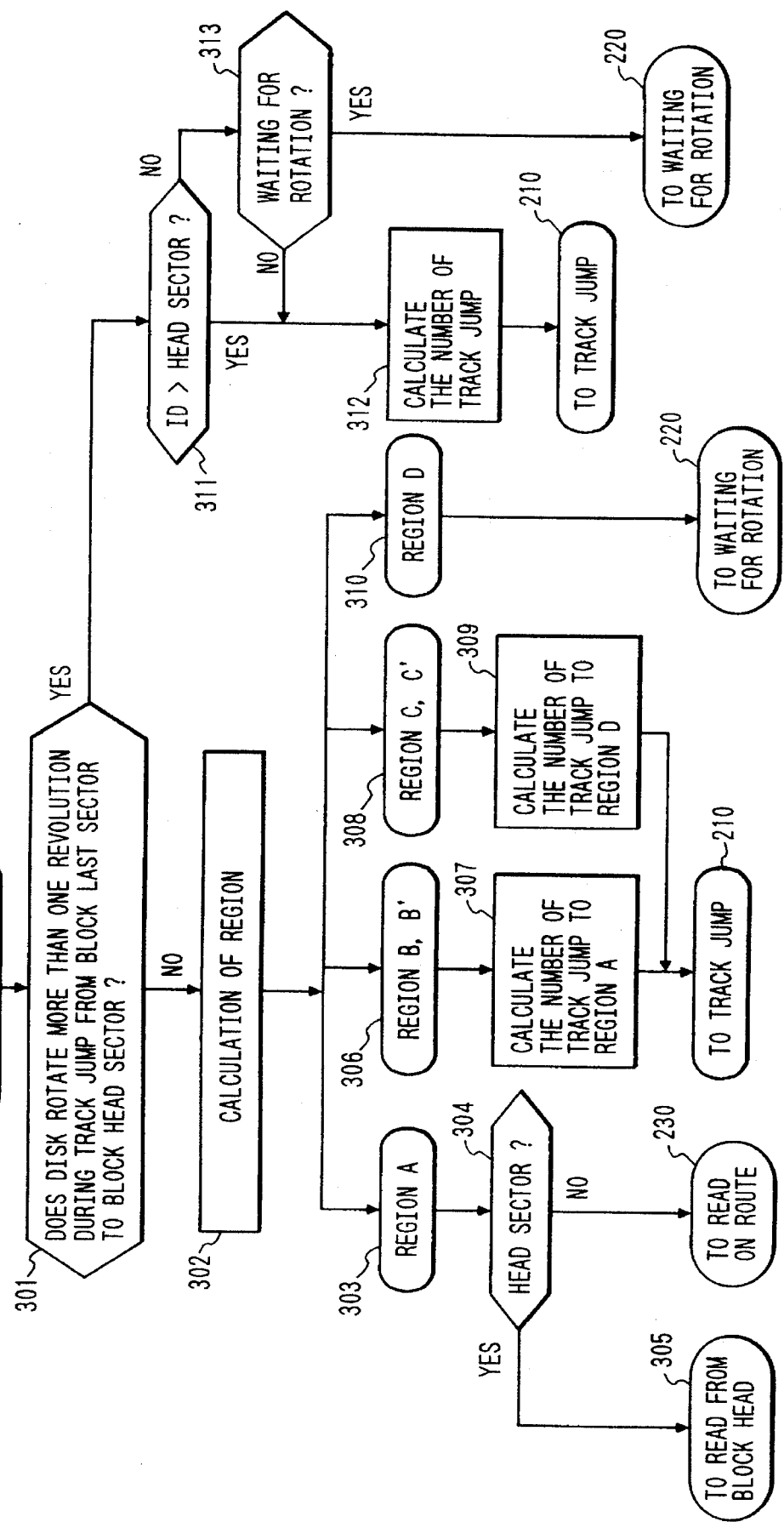
FIG. 7 is a flowchart for explaining in detail judging steps in FIG. 6.
Figure 8:
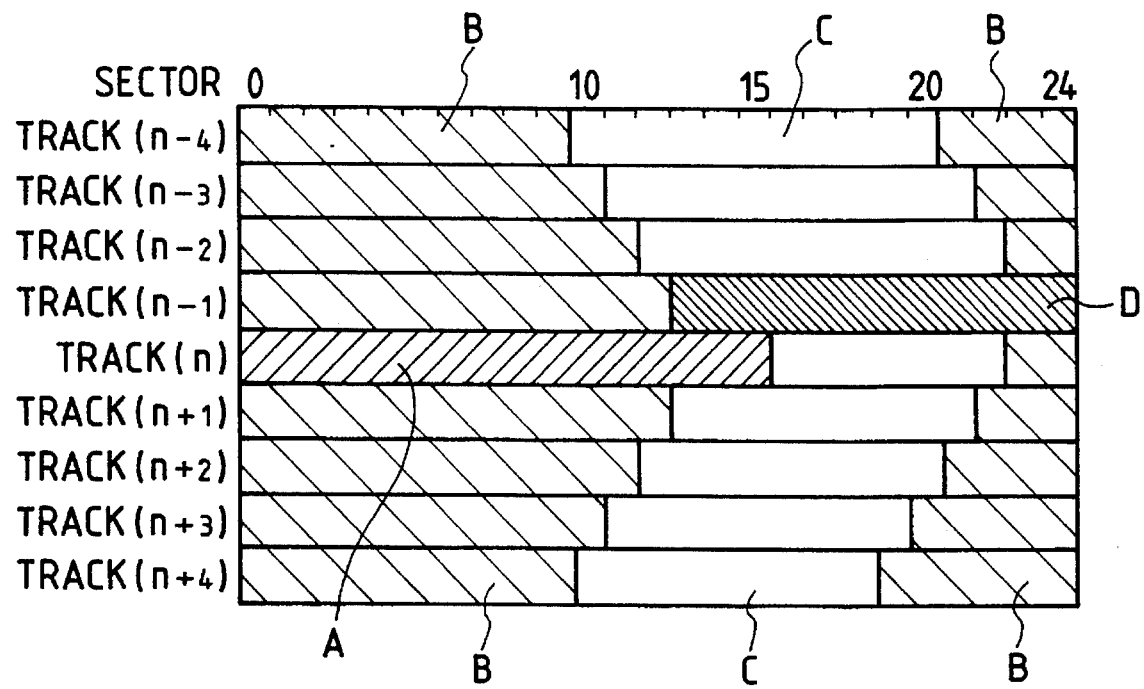
FIG. 8 is a schematic diagram showing regions of the tracks which are judged by the method of FIG. 7.

A reproduction command is first transmitted from the host computer 2 to the optical disk drive apparatus 1. In this instance, both of the data to be reproduced and the sector address information are also obviously transmitted. The CPU 4 controls the R/W unit 11 so as to seek toward the head position of the instructed reproduction block on the basis of that information (step 201). After completion of the seeking, the CPU 4 instructs the R/W unit 11 to read out the sector ID in order to check the present position (step 202). A process to be executed next is discriminated by the CPU 4 on the basis of the present position obtained and a reproduction block length (step 203). On the basis of the result of the determination, either one of the processes of the track jump (step 210), waiting for rotation (step 220), and reading on route (step 230) is selected as a next process. A practical process for the above judgement is shown in FIG. 7. In the embodiment, the block A of the sectors 0 to 15 of the track n is set to a reproduction block as shown in FIG. 8. In FIG. 8, regions B, C, and D indicate positions after completion of the coarse seeking and the subsequent processes differ depending on those positions. That is, the region B corresponds to a range in which when the track jump is performed from such a position, although no data can be reproduced from the head sector of the block A, the latter half sector can be reproduced. The region C corresponds to a range in which when the track jump is performed from such a position, the last sector of the block A can be reproduced only when the apparatus waits until the optical disk rotates one or more times. Further, the region D corresponds to a range in which data can be reproduced from the head sector of the block A within the waiting for one rotation of the optical disk from such a position. In the embodiment, it is assumed that the number $S_i$ of sectors which the head passes by the rotation of the optical disk in the track jump is determined by the following equation (1).

$$S_i = i + 2 \tag{1}$$

(i: the number of tracks to be jumped)

For instance, in FIG. 8, when it is now assumed that the head jumps one track from the sector 0 of the track n to the track n+1 on the outside, the head passes through three sectors of the sectors 0 to 2 during the jumping operation, so that the recording or reproducing operation can be performed from the sector 3 of the track n+1. The division of the region in FIG. 8 has been determined on the basis of the above idea.

The discriminating process shown in FIG. 7 will now be described. In FIG. 7, the CPU 4 first checks the reproduction block length, namely, discriminates whether the optical disk rotates one or more times or not for a period of time during which the track jump is performed from the block last sector and the head sector is reproduced (step 301). When the optical disk doesn't rotate one or more times, at which position in the region shown in FIG. 8 the present position is located is calculated (step 302). When it is decided that the present position lies within the region (block) A as a result of the calculation, a check is made to see if the present position is located at the head sector or not (step 304). When the present position is located at the head sector, a control is made so as to reproduce the block A from the head sector as it is (step 305). If NO, the processing routine advances to the reading on route (step 230) shown in FIG. 6. On the other hand, when the present position is located in the region B as a result of the calculation (step 306), in order to reproduce the latter half region of the block A, the number of tracks to be jumped to the block A is calculated (step 307). The processing routine advances to the track Jump (step 210) shown in FIG. 6. When the present position lies within the region C (step 308), in order to reproduce from the head sector of the block A, the number of tracks to be jumped to the region D is calculated and the processing routine advances to the track jump (step 210) shown in FIG. 6. Further, when the present position lies within the region D (step 310), the track jump is not performed but the processing routine directly advances to the waiting for rotation (step 220) in order to reproduce from the head sector of the block A.

On the other hand, when it is determined in step 30 that the optical disk rotates one or more times, in order to reproduce from the head sector of the block A, the present position and the head sector of the block A are first compared (step 311). When the present position goes beyond the head sector, the number of tracks to be Jumped which are necessary to reproduce the head sector from the present position is counted (step 312). The processing routine advances to the track Jump (step 210). When the present position doesn't exceed the head sector, a check is made to see which one of (1) the time that is required to access to the head sector when the track jump is performed from the present position and (2) the time that is required to access to the head sector when the apparatus waits for rotation without jumping the tracks is faster (step 313). When the latter is faster, the processing routine directly advances to the waiting for rotation (step 220). When the former is faster, the processing routine advances to steps 312 and 210 in a manner similar to that mentioned above.

The judging process is finished as mentioned above. In accordance with the result of the judgment, the processing routine advances to either one of the processes of the track jump (step 210), waiting for rotation(step 220), and reading on route (step 230) shown in FIG. 6. In FIG. 6, first, when it is determined that the process is the track jump, the tracks of the designated number are jumped an the processing routine is again returned to step 202 and the ID of the jumped track is read. A judging process similar to that mentioned above is again executed and the processing routine advances to either one of the waiting for rotation and the reading on route in accordance with the result of the judgment. When the result of the judgment indicates the waiting for rotation, the apparatus waits for the rotation until the head sector of the block A and the data is sequentially reproduced from the head sector (step 221). The reproduction data is stored into the buffer RAM 8 shown in FIG. 4. At the same time, the reproduction data in the buffer RAM 8 is sequentially transferred to the host computer 2 (step 222). When all of the data of the block A is reproduced and transferred, the processing routine is finished. When the result of the judgment indicates the reading on route, the latter half block in a range from the present sector of the block A to the last sector is reproduced (step 231) and stored into the buffer RAM 8. Subsequently, the tracks are jumped to the head of the block A (step 232). The remainder of the block in a range from the head sector to the sector before the reading on route which is not yet reproduced is reproduced and stored into the buffer RAM 8 (step 233). At the same time, the reproduction data in the buffer RAM 8 is sequentially transferred from the head sector to the host computer 2 (step 234). When all of the data of the block A is transferred, all of the processes are finished.

Figure 9:
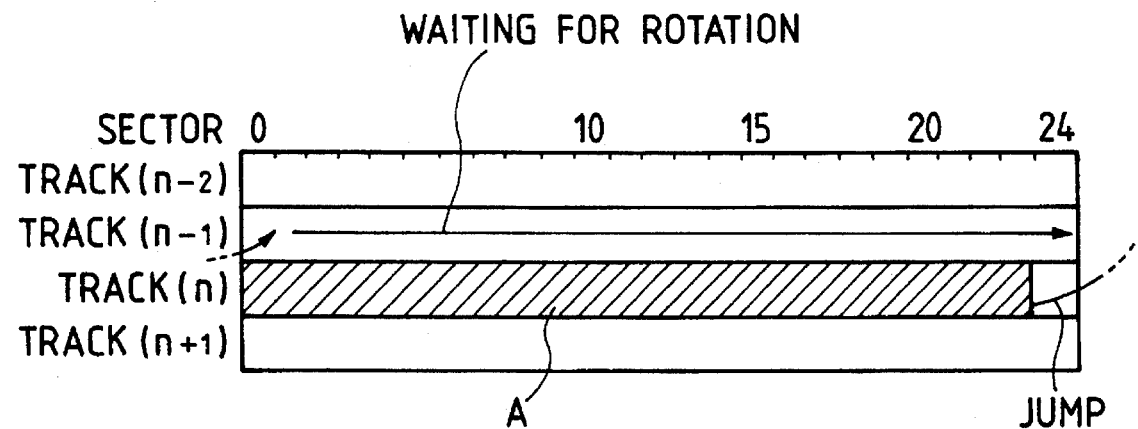
FIG. 9 is a schematic diagram showing states of the tracks which are judged by the first step in the method of FIG. 7.

The case when it is determined in step 301 in FIG. 7 that the optical disk rotates one or more times occurs as shown in FIG. 9. When the head is jumped from the last portion of the block A to the track n−2, the light spot reaches the track n−1 because the disk rotates during the track jumping operation. The head traces the track n−1 until the light spot reaches the head position of the block A due to the waiting for rotation. The disk rotates one or more times for a total period of time of the jumping period and the rotation waiting period. In such a case, even if the block A is reproduced/recorded on route a period of time during which the disk is rotated one or more times is needed to access the light spot from the end of the block A to the head of the block A, so that an effect to reduce the reproducing/recording processing time is not obtained. In such a case, therefore, the processing routine advances to step 311 so as to always reproduce/record the block A from the head.

Figure 10A:
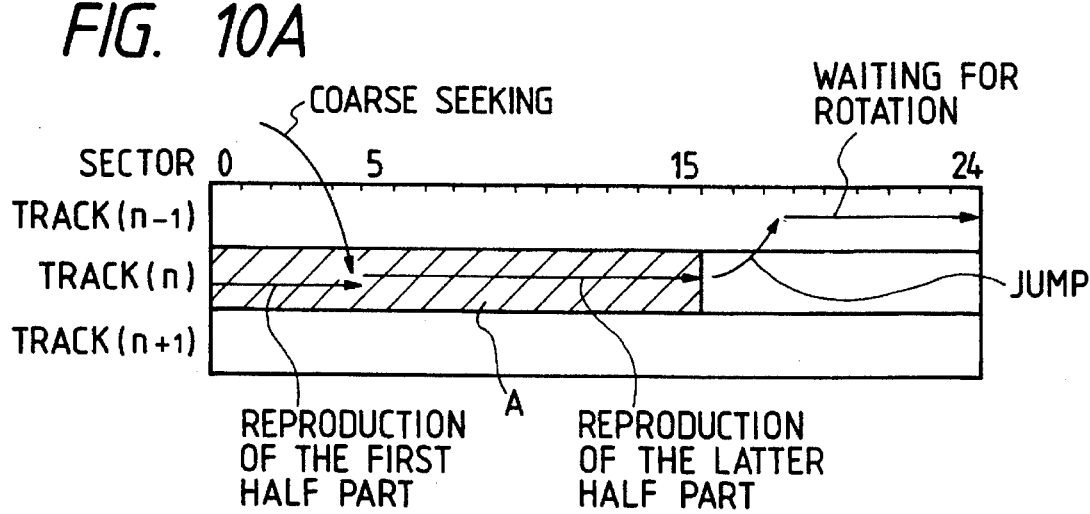
FIGS. 10A to 10C are schematic diagrams for explaining track accessing states according to methods of the invention.
Figure 10B:
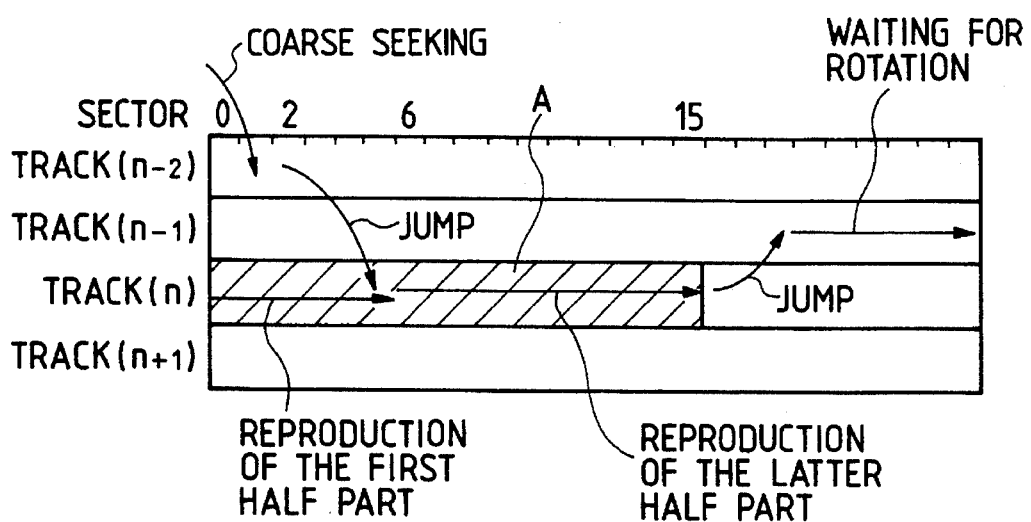
Figure 10C:
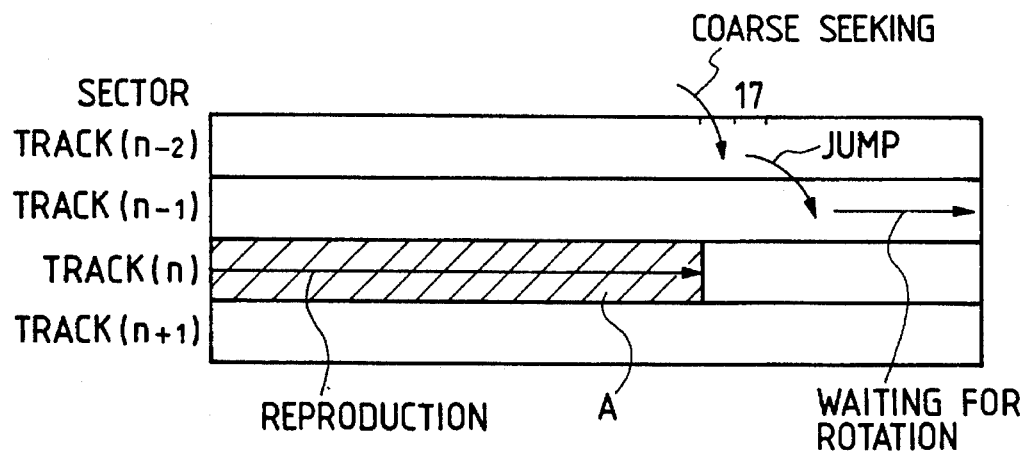

The operation when each region shown in FIG. 8 is actually sought will now be described further in detail with reference to FIGS. 10A to 10C. In FIGS. 10A to 10C, letter A denotes a block to be reproduced as described in FIG. 8 and 16 sectors of the sectors 0 to 15 of the track n and 8 bytes correspond to the block A. In the track jump from the last sector of the block A to the head sector, there is no need to wait for the rotation the disk of one or more times. FIG. 10A shows an example in the case when the region A in FIG. 8 was sought. FIG. 10B shows an example in the case when the region B was sought. FIG. 10C shows an example in the case when the region C was sought. In the example of FIG. 10A, since the position at the time of the execution of the coarse seeking is on route of the block A to be reproduced, the latter half part of the block A is first reproduced. Subsequently, the last sector of the block A is reproduced and the head is jumped to one-preceding track and the apparatus waits for the rotation of the disk. After that, the remaining former half part is reproduced from the head of the block A. In the example of FIG. 10B, since the coarsely sought position is located at the sector 2 (region B) of the track n−2, the head is jumped to the block A and the latter half part of the block A is reproduced from the jumped position. After that, the head is jumped to the one-preceding track in a manner similar to that mentioned above. After the apparatus waits for the rotation, the remaining former half part is reproduced from the head of the block A. In the example of FIG. 10C, since the coarsely sought position is located at the sector 7 (region C) of the track n−2, the jumping of one track and the waiting for rotation are executed and, after that, the data is sequentially reproduced from the head of the block A.

Figure 1:
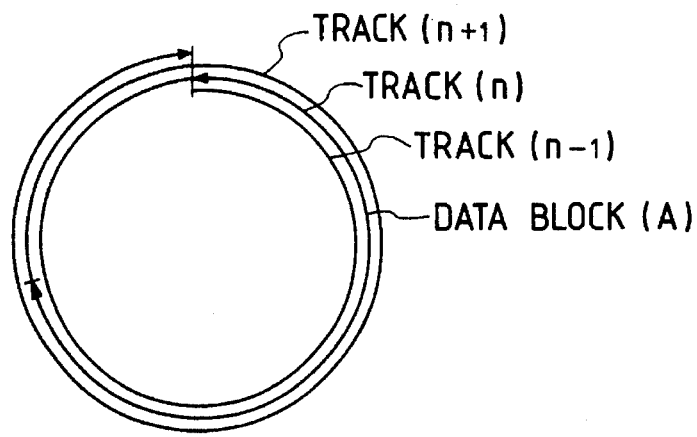
FIG. 1 is a schematic diagram showing spiral tracks formed on a conventional information recording medium.

FIG. 1 is a flowchart for explaining in detail the region calculating step in FIG. 7. Each symbol has the following meaning:

m: the number of sectors in one track $T_p$: track number of the track which is being traced at present by the light spot $S_p$: sector number of the sector which is being traced at present by the light spot $T_o$: track number of the head of the block A $T_o'$: track number of the end of the block A $S_o$: sector number of the end of the block A k: the number of sectors through which the light spot passes for a period of time during which one track is jumped.

Figure 11:
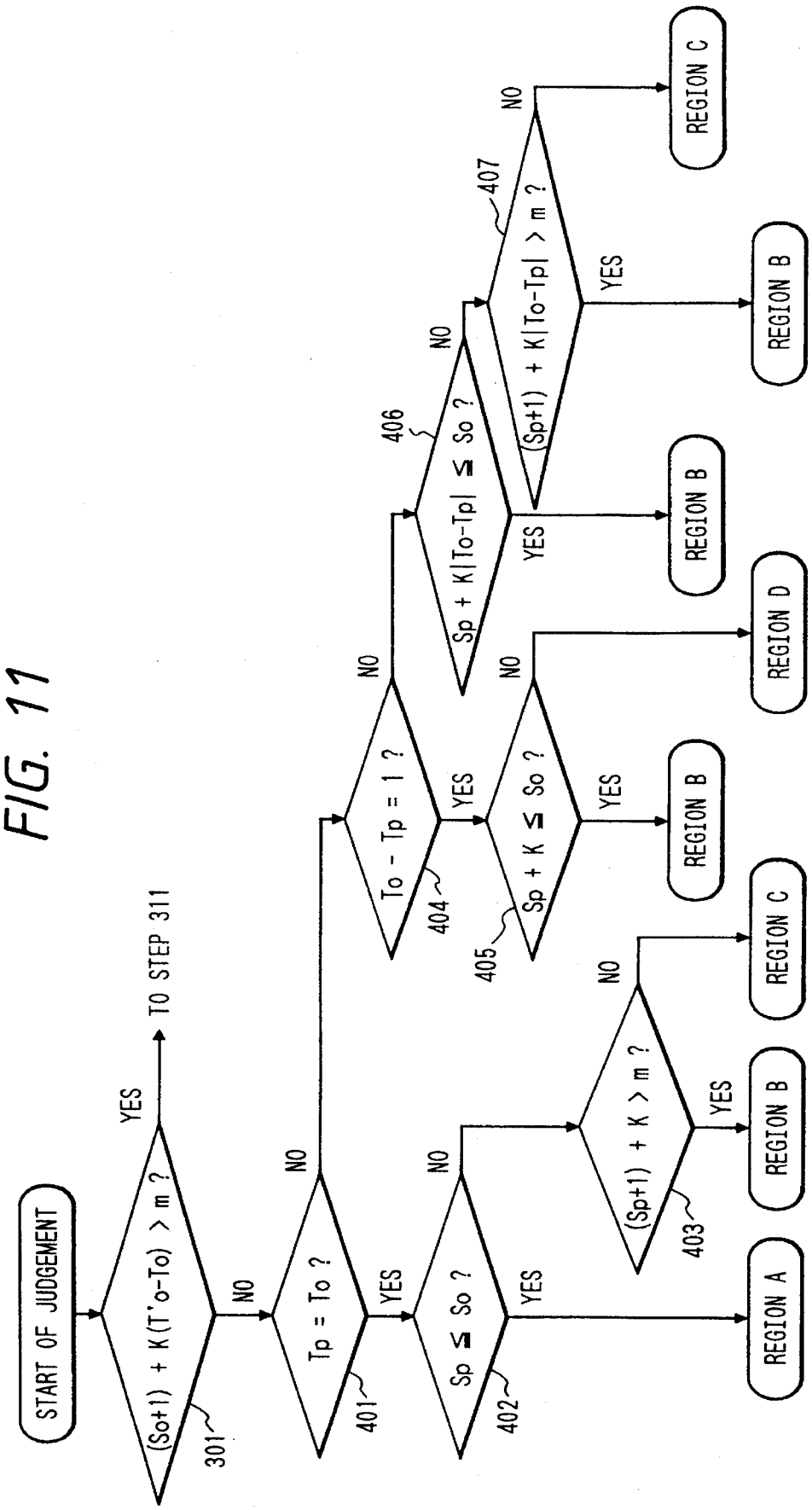
FIG. 11 is a flowchart for explaining in detail a region calculating step in FIG. 7.

In the method of FIG. 11, in the first step 301, the light spot is moved from the last position of the block A to the one-preceding track of the track in which the block A exists. A check is made to see if the medium rotates one or more times or not for a period of time until the reading and/or writing means arrives at the head position of the region A in association with the rotation of the medium while tracing the track. Such a judgment is shown by $$(S_o+1)+k(T_o'-T_o)>m$$

This is because $(S_o+1)$ indicates the last position and $(T_o'-T_o)$ indicates the number of times at which the track jumping operation is executed.

When the answer is NO in step 30, a check is made in step 401 to see if the track that is at present being traced by the light spot is the track with the block A or not. If YES, a check is made in step 402 to see if the sector which is at present being traced by the light spot is before the last sector of the block A or not. If YES, it is determined that such a sector lies in the region A (block A). If NO in step 402, a check is made in step 203 to see if the light spot reaches the position before the head of the block A or not when the light spot is jumped to the one-preceding track. If YES as a result of the judgment in step 403, it is decided that the current sector lies in the region B. If NO, it is determined that the current sector lies in the region C.

If NO in step 401, a check is made in step 404 to see if the track which is at present being traced by the light spot is the one-preceding track of the track with the block A or not. If YES, a check is made in step 405 to see if the light spot can reach the position before the last sector of the block A or not when the light spot is jumped from the sector which is at present being traced by the light spot to the track with the block A. If YES in step 405, the region B is decided. If NO, the region D is determined. If NO in step 404, a check is made in step 406 to see if the light spot can reach the position before the last sector of the block A or not when the light spot is jumped from the sector which is at present being traced by the light spot to the track with the block A. If YES in step 405, the region B is determined.

If NO in step 406, a check is made in step 407 to see if the light spot can reach the position before the head sector of the block A or not when the light spot is jumped from the sector which is at present being traced by the light spot to the track with the block A. If YES in step 207, the region B is determined. If NO, the region C is determined.

Although the above embodiment has been described with respect to the operation in the reproducing mode as an example, information also can be recorded in the recording mode in substantially the same procedure as that in the reproducing mode. The estimation of the number of sectors through which the head passes upon a track jump and the judgment regarding the waiting for rotation upon track jump from the last sector of the recording or reproduction block to the head sector have been decided on the basis of the equation (1). However, the invention is not limited to such a method. For instance, a table is stored into the ROM 5 shown in FIG. 4 and they also can be determined on the basis of such a table. Further, to raise the recording reliability, the number of sectors in which the recording or reproduction is impossible and which is obtained by the equation (1) also can be raised. In the embodiment, the number of such sectors is not concerned with the present track position. However, in a case of an MCAV (Modified Constant Angular Velocity) system in which the number of sectors of one track differs depending on the position in the radial direction of the disk, for instance, it is desirable to decide the number of sectors in accordance with the disk format, characteristics of the apparatus, or the like by increasing the number of sectors on the side of the outer periphery of the disk or the like.

According to the invention as described above, the position which has first been sought is divided into a plurality of regions of different processes until the recording or reproduction is executed. The starting position for recording or reproduction is set to the head of the recording or reproduction block or from a desired position on route in accordance with the region. Thus, the rotation waiting time of the recording medium can be minimized. There is an effect such that the recording or reproducing processing time can be remarkably reduced as compared with that in the conventional apparatus.

What is claimed is:

1. A method of accessing at least one of reading means and writing means to a desired region of an information recording medium on which a plurality of tracks are spirally formed, said method comprising the steps of:
   rotating the medium;
   estimating an arrival position when at least one of the reading means and the writing means is accessed to the track having the desired region;
   accessing at least one of the reading means and the writing means to the track having the desired region when the estimated position lies within the desired region; and
   accessing at least one of the reading means and the writing means to one-preceding track of the track having the desired region when the estimated position is located after the desired region.

2. An apparatus for effecting at least one of reproducing information from and recording information to a desired region of an information recording medium on which a plurality of tracks are spirally formed, said apparatus comprising:
   means for rotating the medium;
   at least one of reading and writing means for effecting at least one of recording and reproducing information while tracing the track;
   accessing means for accessing at least one of said reading and writing means to a desired track;
   estimating means for estimating an arrival position when at least one of said reading and writing means is accessed to the track having the desired region; and
   control means for controlling said accessing means in accordance with the estimated arrival position, wherein said control means controls said accessing means so as to access at least one of said reading and writing means to the track having the desired region when the estimated arrival position lies within the desired region and to access at least one of said reading and writing means to one-preceding track of the track having the desired region when the estimated arrival position is located after the desired region.

3. An apparatus according to claim 2, wherein at least one of said reading and writing means comprises an optical head having a light source for emitting a laser beam and a lens for converging the laser beam emitted from said light source onto the medium.

4. An apparatus according to claim 3, wherein said accessing means comprises:
   a motor for moving the optical head in a direction so as to traverse the tracks;
   an actuator for moving the lens in the direction so as to traverse the tracks; and
   a jump pulse generating circuit for supplying a jump pulse signal to said actuator.

5. An apparatus according to claim 2, wherein each of the tracks is divided into a plurality of sectors, sector identification information having been recorded in each of the sectors, and said estimating means estimates the arrival position on the basis of the sector identification information of a sector which is being traced by at least one of said reading and writing means and the sector identification information of the desired region.

6. A method of effecting at least one of reproducing and recording information by at least one of reading and writing means from/to a desired region of an information recording medium on which a plurality of tracks are spirally formed, said method comprising the steps of:
   rotating the medium;
   estimating an arrival position when at least one of the reading and writing means is accessed to the track having the desired region;
   accessing at least one of the reading and writing means to the track having the desired region when the estimated position lies within the desired region;
   effecting at least one of reproducing and recording information from the head of the desired region when the arrival position of at least one of the reading and writing means is located at the head of the desired region;
   first effecting at least one of reproducing and recording information to a portion after the arrival position of the region when the arrival position of at least one of the reading and writing means is located on route to the desired region, subsequently moving at least one of the reading and writing means to one-preceding track of the track having the desired region, waiting until at least one of the reading and writing means arrives at the head position of the region in association with the rotation of the medium while tracing the track, and effecting at least one of reproducing and recording information from the head of the region to the portion before the arrival position; and
   accessing at least one of the reading and writing means to one-preceding track of the track having the desired region when the estimated position is located after the desired region, waiting until at least one of the reading and writing means arrives at the head position of the region in association with the rotation of the medium while tracing the track, and effecting at least one of reproducing and recording information from the head of the region after that.

7. A method of effecting at least one of reproducing and recording information by at least one of reading and writing means from/to a desired region of an information recording medium on which a plurality of tracks are spirally formed, said method comprising the steps of:

rotating the medium;

moving at least one of the reading and writing means from the last position of the desired region to one-preceding track of the track having the desired region and judging whether the medium has been rotated one or more times for a period of time during which at least one of the reading and writing means arrives at the head position of the region in association with the rotation of the medium while tracing the track;

accessing at least one of the reading and writing means to one-preceding track of the track having the desired region when it is determined that the medium rotates one or more times, waiting until at least one of the reading and writing means arrives at the head position of the region in association with the rotation of the medium while tracing the track, and effecting at least one of reproducing and recording information from the head of the region;

estimating an arrival position when at least one of the reading and writing means is accessed to the track having the desired region when it is determined that the medium does not rotate one or more times;

accessing at least one of the reading and writing means to the track having the desired region when the estimated position lies within the desired region;

effecting at least one of reproducing and recording information from the head of the desired region when the arrival position of at least one of the reading and writing means is located at the head of the desired region;

first effecting at least one of reproducing and recording information to a portion after the arrival position of the region when the arrival position of at least one of the reading and writing means is located on route to the desired region, subsequently moving at least one of the reading and writing means to one-preceding track of the track having the desired region, waiting until at least one of the reading and writing means arrives at the head position of the region in association with the rotation of the medium while tracing the track, and effecting at least one of reproducing and recording information from the head of the region to a portion before the arrival position; and accessing at least one of the reading and writing means to one-preceding track of the track having the desired region when the predicted position is located after the desired region, waiting until at least one of the reading and writing means arrives at the head position of the region in association with the rotation of the medium while tracing the track, and effecting at least one of reproducing and recording information from the head of the region.

* * * * *

UNITED STATES PATENT AND TRADEMARK OFFICE
CERTIFICATE OF CORRECTION

PATENT NO. : 5,500,840
DATED : March 19, 1996
INVENTOR(S) : Yutaka OGASAWARA

It is certified that error appears in the above-indentified patent and that said Letters Patent is hereby corrected as shown below:

ON THE COVER PAGE:

In the "ABSTRACT", item [57],

Line 9, "access to" should read --to access--.

COLUMN 1:

Line 52, "22." should read --24.--.

COLUMN 3:

Line 67, "FIG. 2" should read --FIG. 4--.

COLUMN 4:

Line 62, "wellknown" should read --well-known--.

UNITED STATES PATENT AND TRADEMARK OFFICE
CERTIFICATE OF CORRECTION

PATENT NO. : 5,500,840
DATED : March 19, 1996
INVENTOR(S) : Yutaka OGASAWARA

It is certified that error appears in the above-indentified patent and that said Letters Patent is hereby corrected as shown below:

COLUMN 6:

Line 17, "times, at which" should read --times in that period, the--;
Line 18, "the present position" should read --at which the present position--;
Line 31, "Jump" should read --jump--;
Line 47, "Jumped" should read --jumped--;
Line 50, "Jump" should read --jump--; and
Line 67, "an" should read --and--.

COLUMN 7:

Line 51, "the disk of" should read --of the disk--.

UNITED STATES PATENT AND TRADEMARK OFFICE
CERTIFICATE OF CORRECTION

PATENT NO. : 5,500,840
DATED : March 19, 1996
INVENTOR(S) : Yutaka OGASAWARA

It is certified that error appears in the above-indentified patent and that said Letters Patent is hereby corrected as shown below:

COLUMN 8:

Line 9, "FIG. 1" should read --FIG. 11--.

Signed and Sealed this

Tenth Day of September, 1996

Attest:

BRUCE LEHMAN

Attesting Officer     Commissioner of Patents and Trademarks